United States Patent [19]
Hu

[11] Patent Number: 5,878,625
[45] Date of Patent: Mar. 9, 1999

[54] BRAKE ACTUATING DEVICE

[75] Inventor: Nai Shing Hu, Hsin-Chuang, Taiwan

[73] Assignee: Fong Hsiang Metal Industry Co., Ltd., Hsin Chuang, Taiwan

[21] Appl. No.: 897,006

[22] Filed: Jul. 18, 1997

[51] Int. Cl.[6] ...................................................... F16C 1/10
[52] U.S. Cl. ............................ 74/502.2; 74/489; 74/526; 74/529
[58] Field of Search .......................... 74/529, 489, 502.2, 74/523, 526

[56] References Cited

U.S. PATENT DOCUMENTS

| | | | |
|---|---|---|---|
| 5,279,180 | 1/1994 | Henriksson | 74/502.2 |
| 5,664,460 | 9/1997 | Hewson | 74/489 |
| 5,716,063 | 2/1998 | Doyle et al. | 74/502.2 |

*Primary Examiner*—Charles A. Marmor
*Assistant Examiner*—William C. Joyce
*Attorney, Agent, or Firm*—Bacon & Thomas, PLLC

[57] ABSTRACT

An actuating device comprising a bracket and an operating device is provided. The front end portion of the operating device is provided with an anchoring portion and a first operating portion. The first operating portion defines a first, a second and a third edge which are connected with each other. The bracket is provided with a first post which passes through the receiving chamber. The operating device can be moved such that the first operating portion is contacted with the first post. Wherein when the operating device is moved upward, a temporary braking function is effected; and when the operating device is moved downward, a continuous braking function is effected.

3 Claims, 6 Drawing Sheets

BRAKE ACTUATING DEVICE

FILED OF THE INVENTION

The present invention relates to an apparatus for cooperation with a braking mechanism for stopping the movement of an object. For example, the present invention can be installed with the handles of a walker with wheels to control the movement of the walker.

BACKGROUND

A walker with wheels (i.e. rollator, or rolling walker) has become increasingly more popular. For example, U.S. Pat. Nos. 4,907,794 and 5,020,560 discloses a foldable rolling walker. Consequently, a braking system is needed to stop the wheels. However, such braking system is a temporally braking device which is similar to that of a bicycle, i.e. a braking effect is actuated only when a user pulls up the braking handle.

U.S. Pat. No. 5,279,180 (Henriksson) discloses a braking system which can be operated in two ways, i.e. temporally and continuously braking status. When a user pushes an operative arm of downward, by utilizing the "locking force", the operative arm is maintained in a continuously locking position. Therefore, when the user releases the operative arm, for example, the wheels of a rolling walker are still braked. However, the "locking force" must be larger than the returning force of the releasing spring installed in the braking system, which may causes the following disadvantages:

1. The locking engagement between an operative arm and a bracket is affected by an interference fit therebetween and, as a result, after a period of usage, the contacting area will be worn out and the "locking force" will be diminished.

2. Because the "locking force" is larger than the returning force of the releasing spring, the force of pushing the operative arm of downward, therefore, must larger than the returning force of the releasing spring. The pushing force will hasten the deterioration of the contacting area of the operative arm and the bracket.

SUMMARY OF THE INVENTION

It is an objective of this invention to solve the disadvantages of the above prior art.

Another objective of this invention is to simplify the mechanism of an actuating device.

The present invention comprises a bracket and an operating device. The bracket comprises a mounting device and a receiving chamber. The actuating device can be mounted to another device, such as a rolling walker, to actuate the braking function for wheels. The front end portion of the operating device can be received within the receiving chamber.

According to one aspect of the present invention, the operating device can be operated at three different positions corresponding to the bracket. When the operating device is located at the second position, the braking function is not affected. When the operating device is moved upward by an external force (e.g. user's hand), a temporary braking function is attained and when the external force is removed, the operating device will quickly return to the second position to stop the braking function. When the operating device is moved downward, the operating device can be continuously locked to prolong the braking function. The above function can be achieved by the first operating portion of the operating device.

DETAILED DESCRIPTION OF PREFERRED EMBODIMENTS

Figure 1:
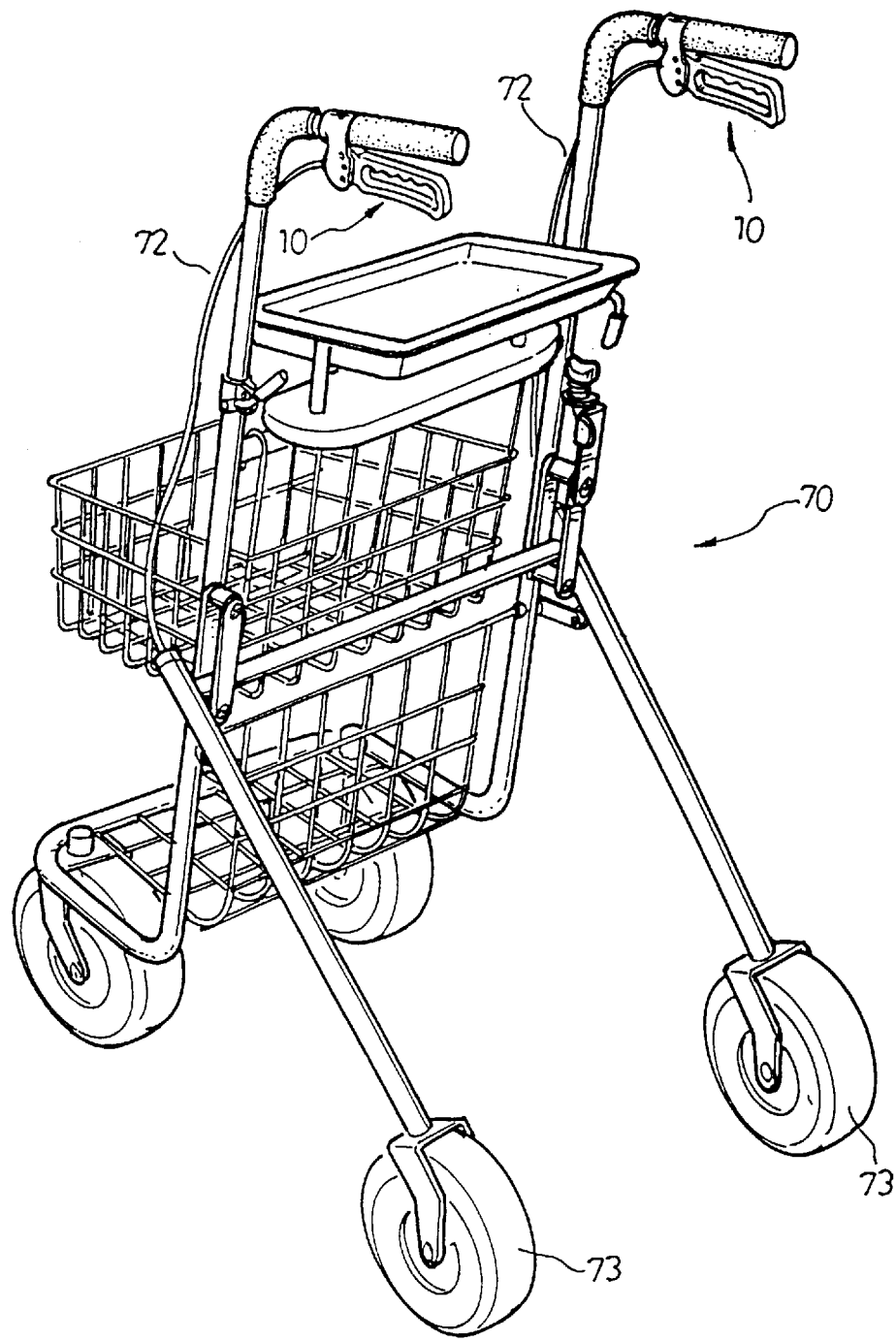
FIG. 1 is a perspective view of a walker in which the actuating device according to a first embodiment of the invention is installed.

Referring to FIG. 1, a walker 70 is shown and which is installed with an actuating device 10 to brake the wheels 73 through braking cables 72.

Figure 2:
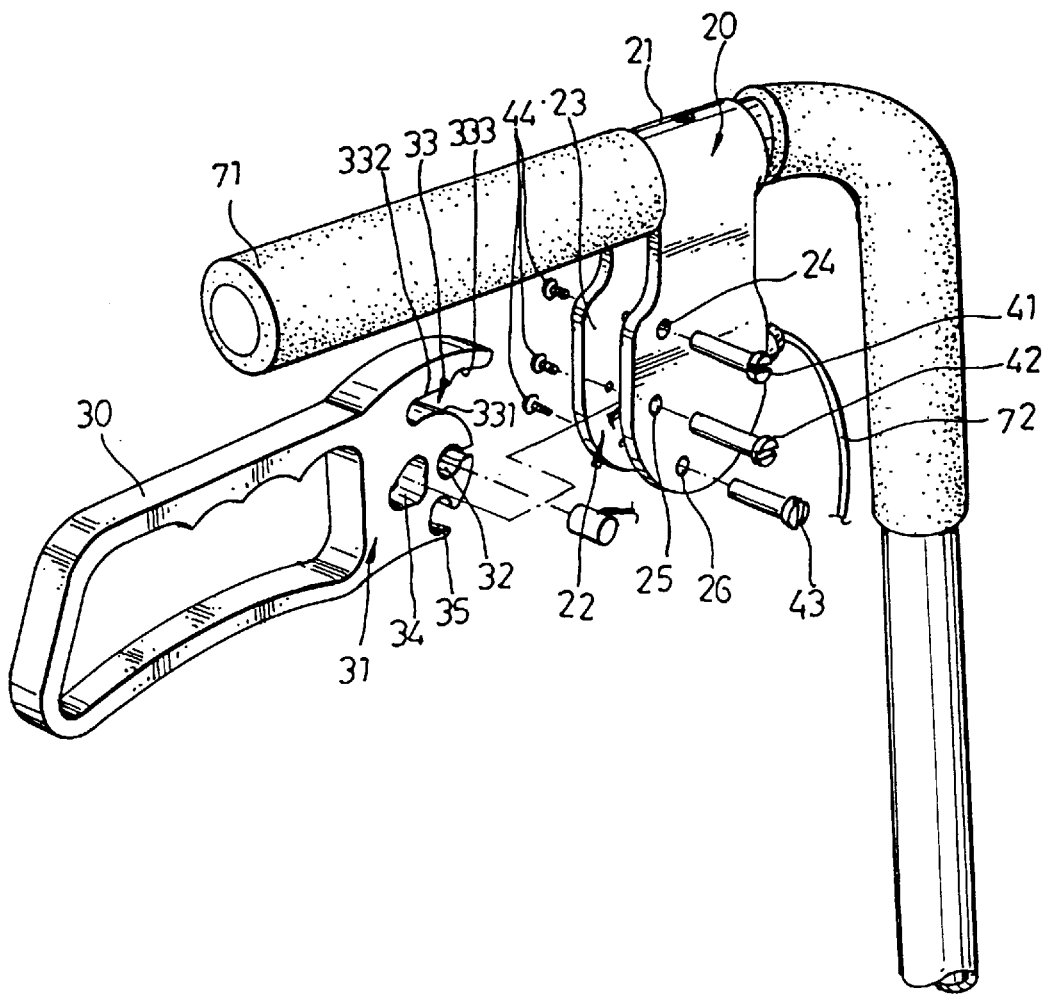
FIG. 2 is an exploded perspective view of the first embodiment of the actuating device.
Figure 3:
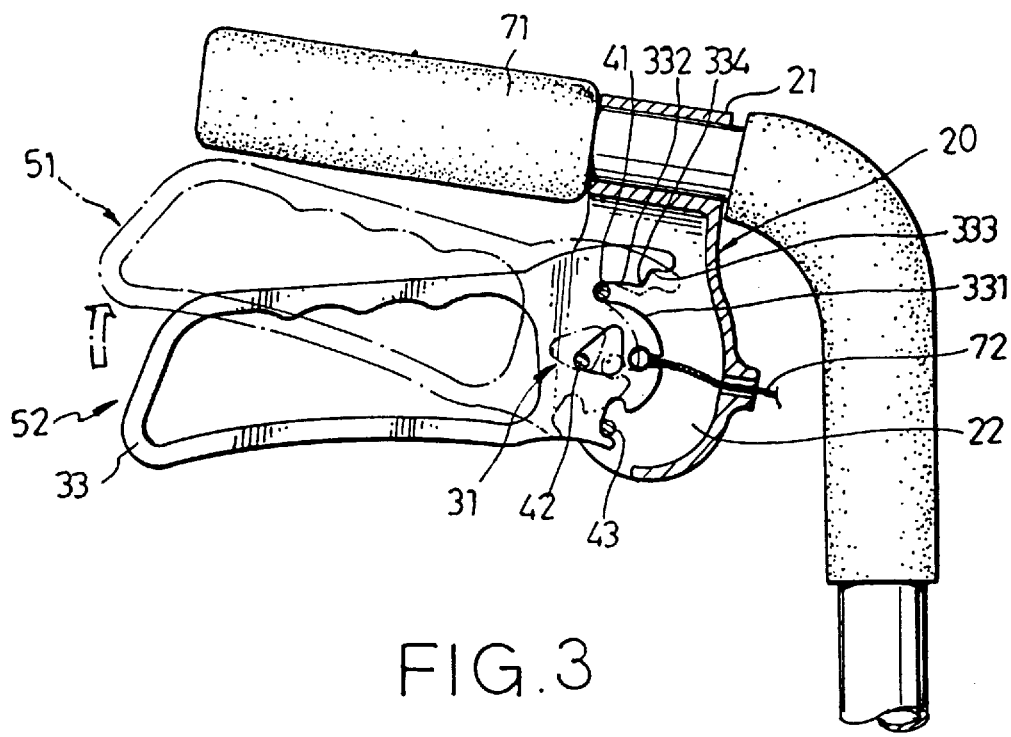
FIGS. 3 and 4 are the schematic illustrations of a first embodiment of the actuating device.
Figure 4:
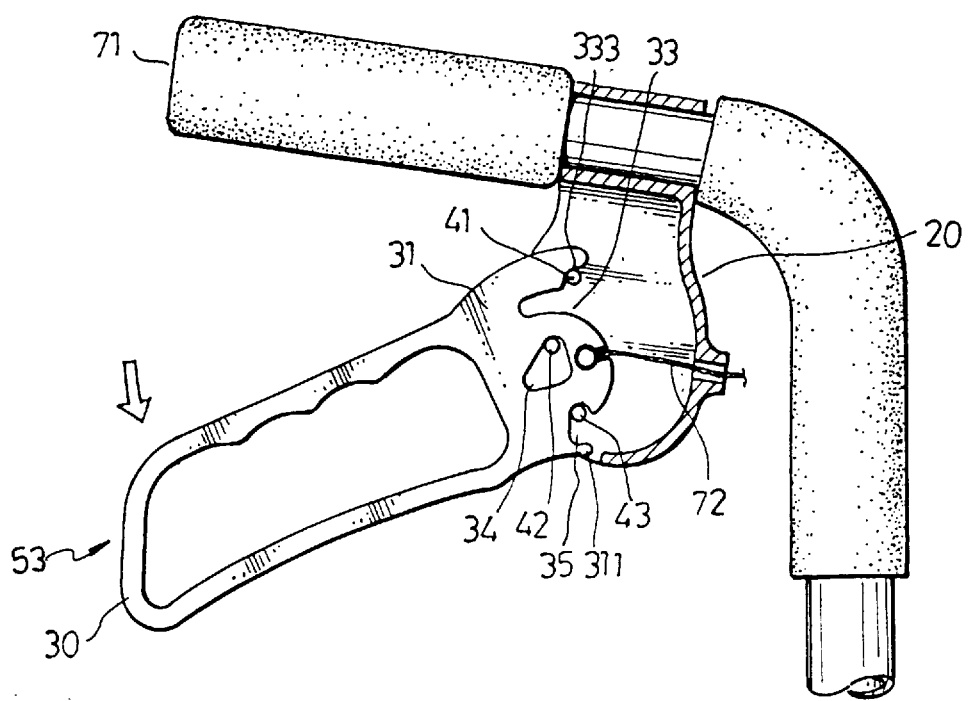

Referring to FIGS. 2 to 4, the actuating device 10 mainly comprises a bracket 20 and a operating device 30. In this first embodiment, the bracket 20 defines a mounting device 21 and a receiving chamber 22. The actuating device 10 can be readily installed to a handlebar 71 of walker 70 with the mounting device 21 of the bracket 20. The receiving chamber 22 is provided with an opening 23 with which the front end portion 31 of the operating device 30 can be pivotally installed therein.

The front end portion 31 of the operating device 30 is provided with an anchoring portion 32 for fixing the anchoring head of the braking cable 72 thereof. The other end of the braking cable 72 is connected to the braking mechanisms disposed adjacent to the wheels 73 of the walker 70. A detailed description of the latter is not provided herein since it is well known to those skilled in the art.

The bracket 20 is provided with a first, second and third mounting holes 24, 25 and 26 in which a first, a second and a third post 41, 42 and 43, each having a threaded recess at the free end thereof can be fixedly retained to bracket 20 by means of locking screws 44. The front end portion 31 of the operating device 30 is provided with a first, a second and a third operating portion 33, 34 and 35 corresponding to the first, second and third posts 24, 25 and 26 respectively. The first operating portion 33 defines the first, second and third edges 331, 332 and 333.

Normally, the operating device 30 is at the second position 52 when the braking mechanism is not actuated. When the operating device 30 is pulled upward to the first position 51, a temporary braking is actuated. After the external force (e.g. force from user's fingers) applied to the operating device 30 is released, the operating device 30 is returned to the second position 52 by the returning force of the braking cable 72. When the operating device 30 is located at the first and second positions 51 and 52, the first post 41 is positioned between the first and second edges 331 and 332 of the first operating portion 33.

When the operating device 30 is pushed downward, the operating device 30 moves to the third position 53 such that a continuous braking is effected. In this situation, the first post 41 is located at the third edge 333 of the first operating portion 33. An intersecting angle 334 is defined between the second edge 332 and the third edge 333. Preferably, angle 334 is less than 120 degrees such that the returning force of the braking cable 72 can be overcome.

Furthermore, because the first post 41 is disposed above the anchoring portion 32, the braking cable 72 can provide a counterclockwise torque to the first post 41, and therefore even when the external force applied to the operating device 30 is removed, the operating device 30 will be maintained in position 53 by the torque applied from the braking cable 72. As a result, a continuous braking status is achieved.

Figure 5:
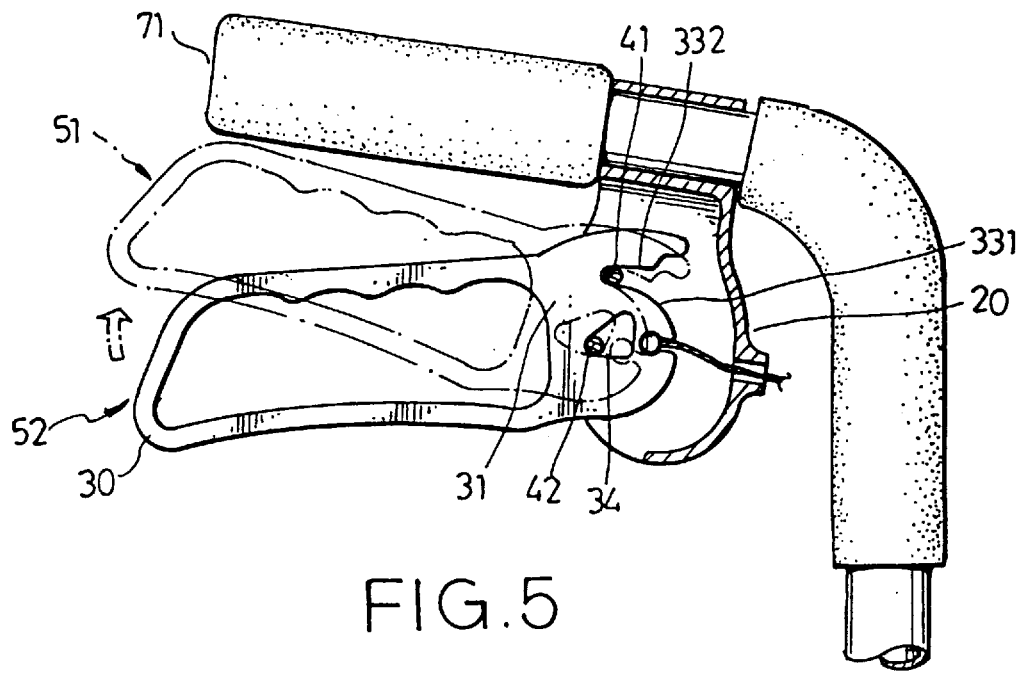
FIGS. 5 and 6 are schematic illustrations of a second embodiment of the actuating device.
Figure 6:
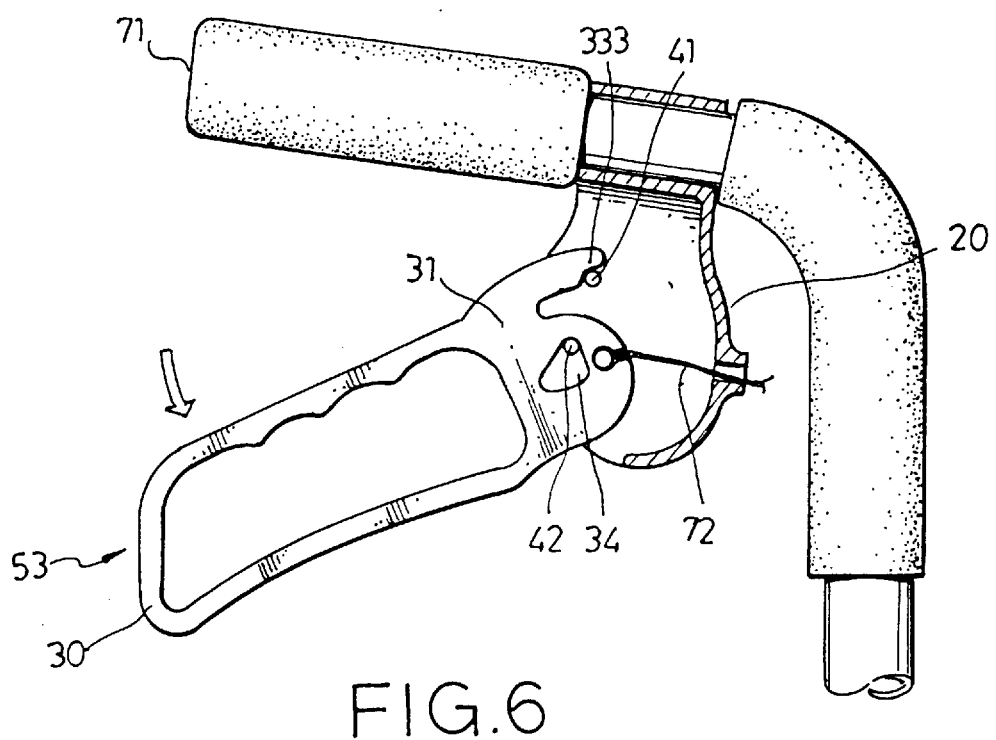

From the forgoing description, the main function of the first operating portion 33 is to provide a locking force to the operating device 30 which is at the third position 53. The second operating portion 34 has a triangular shape in this embodiment and it is used to prevent the operating device 30 from escaping when the braking cable 72 is broken. Therefore, the second operating portion 34 is designed as a closed hole. The second operating portion 34 shall be specially designed such that the operating device 30 will not be limited by the second post 42 when the operating device 30 is moved upward or downward. Consequently, the second operating portion 34 should be designed as a hole with a proper size. The main function of the third operating portion 35 is to provide an ending point when the operating device 30 is pushed downward by a user. As a result, a better operation feeling can be provided while the user is pushing the operating device 30 downward. In fact, the third operating portion 35 can be omitted or be replaced by the modified shape (not shown) of the lower portion 311 of the front end portion 31. The lower portion 311 can also be served as an ending point cooperated with the contacting area of bracket 20. In the second and third embodiments, the third operating portion 35 is omitted (referring to FIGS. 5 and 6). Because the braking functions of the second embodiment are the same as those of the first embodiment except the lack of better operation feeling, no further description is given herein.

Figure 7:
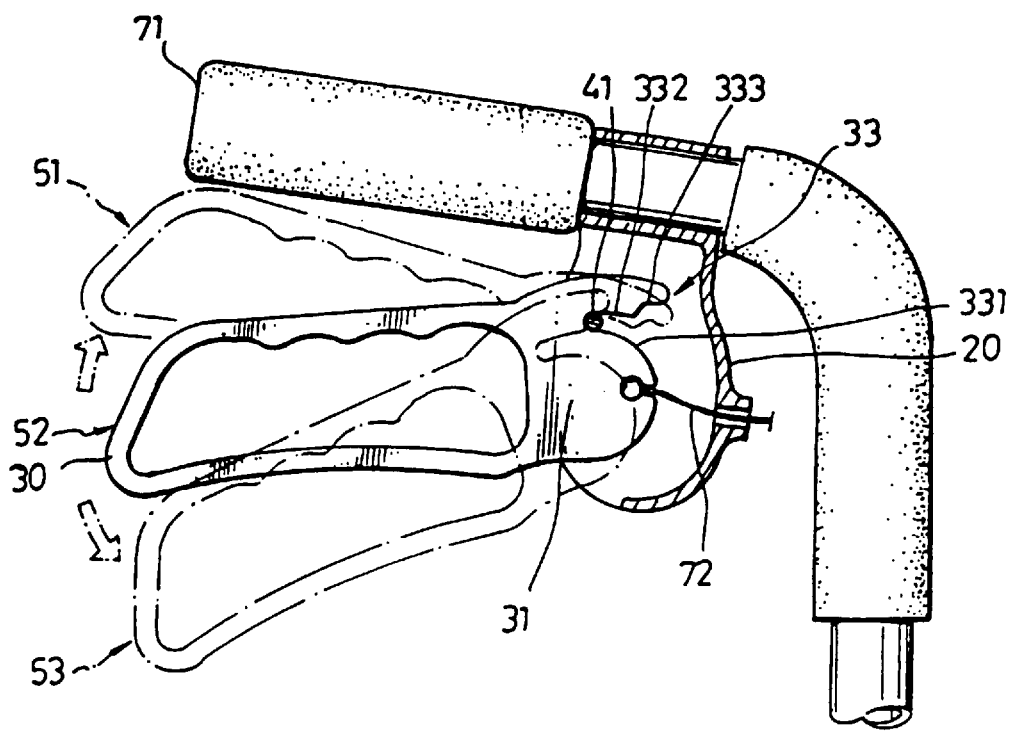
FIG. 7 is a schematic illustration of a third embodiment of the actuating device.

As described above, the main function of the second operating portion 34 is to prevent the operating device 30 from falling off when the braking cable 72 is broken. However, such situation seldom happens, and therefore the second operating portion 34 can be also omitted. As shown in FIG. 7, the second operating portion 34 is omitted in the third embodiment. Although the configuration is simplified, the braking effect is identical to the first embodiment, consequently, no further detailed description is given.

Figure 8:
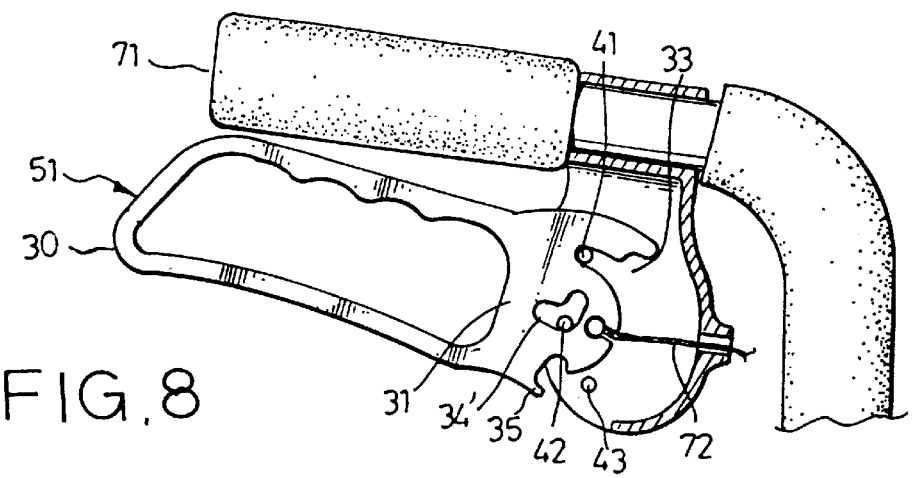
FIGS. 8 to 10 are schematic illustrations of a fourth embodiment of the actuating device.
Figure 9:
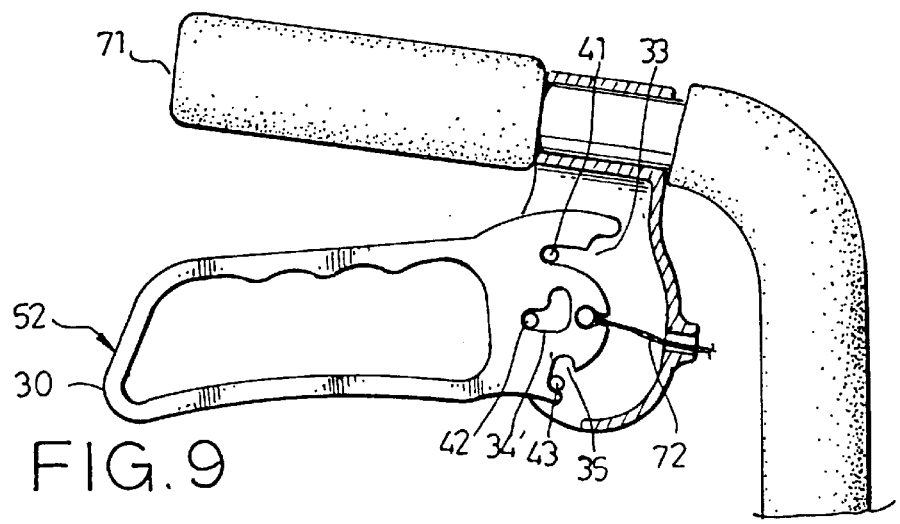
Figure 10:
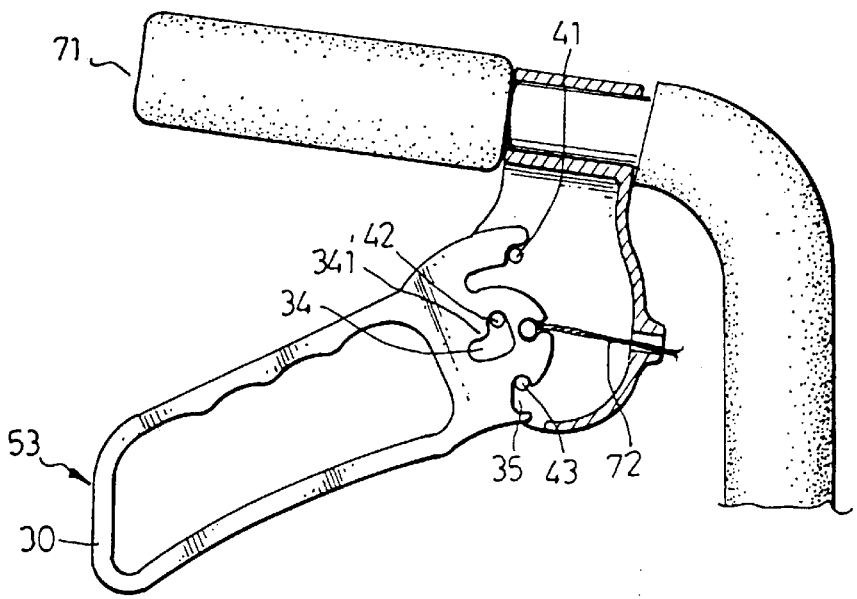

FIGS. 8 to 10 are the schematic illustrations of the consecutive movements of the fourth embodiment. The difference of the fourth embodiment from the first embodiment is that the second operating portion 34' is provided with a projected portion 341'. As a result, the projecting portion 341' can help maintain (just a little) the operating device 30 at the third position 53. Because the working principle and braking operation are also identical to the first embodiment, no further detail description is given.

The invention in its broader aspects is not limited to the specific details shown and described, and departures may be made from such details without departing from the principles of the invention and without sacrificing its chief advantages. For example, the first operating portion can be a closed hole or the number of the edges forming the first operating portion may be more than three.

I claim:

1. Apparatus for actuating a brake device of a wheeled object comprising:

a bracket comprising a mounting device for mounting said apparatus to the wheeled object and a receiving chamber for receiving an operating divice;

the operating device having a front end portion, the operating device being pivotally installed in said receiving chamber for manually operating said apparatus, wherein the front end portion of said operating device being provided with an anchoring portion and a first operating portion which is defined by a first, a second and a third edge, and wherein said front end portion of said operating device further comprises a second operating portion which is a closed hole, said bracket being further provided with a second post which passes through said receiving chamber of said bracket and said second operating portion of said operating device;

a first post being fixedly mounted and passed through said receiving chamber of said bracket such that said first post is contacted with said first operating portion of said operating device, said first post being disposed in a position above said anchoring portion of said operating device;

wherein said front end portion of said operating device being disposed within said receiving chamber of said bracket such that said operating device can be selectively located at a first, a second or a third position, wherein when said operating device is located at said first or second position, said first post is located between said first and second edges of said first operating portion of said operating device, and wherein when said operating device is located at said third position, said first post is disposed at said third edge of said operating device;

wherein when said operating device is located at said second position, a braking function is not effected, wherein when said operating device is moved to said first position by an upward external force, the braking function is effected temporarily and when said upward external force is removed, the braking function is ineffective, and wherein when said operating device is moved to said third position by a downward external force, the braking function is effected continuously and when said downward external force is released, the braking function is effected continuously.

2. An apparatus as claimed in claim 1, wherein said front end portion of said operating device further comprises a third operating portion, said bracket being further provided with a third post which passes through said receiving chamber of said bracket and being operable with said third operating portion.

3. An apparatus as claimed in claim 1, wherein said second operating portion is provided with a projecting portion and said second post is located above said projecting portion when said operating device is located at said third position.

* * * * *